(12) United States Patent
Nandy et al.

(10) Patent No.: US 8,886,655 B1
(45) Date of Patent: Nov. 11, 2014

(54) VISUAL DISPLAY OF TOPICS AND CONTENT IN A MAP-LIKE INTERFACE

(75) Inventors: Palash Nandy, San Francisco, CA (US); Michael Sho Ogawa, Cupertino, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/370,867

(22) Filed: Feb. 10, 2012

(51) Int. Cl.
*G06F 17/30* (2006.01)
(52) U.S. Cl.
USPC .......................................................... 707/749

(58) Field of Classification Search
None
See application file for complete search history.

(56) References Cited

U.S. PATENT DOCUMENTS

| | | | | |
|---|---|---|---|---|
| 5,848,373 | A * | 12/1998 | DeLorme et al. | 701/455 |
| 6,556,983 | B1 * | 4/2003 | Altschuler et al. | 706/55 |
| 2008/0167794 | A1 * | 7/2008 | Fuchs et al. | 701/117 |
| 2012/0290950 | A1 * | 11/2012 | Rapaport et al. | 715/753 |
| 2013/0198240 | A1 * | 8/2013 | Ameri-Yahia et al. | 707/798 |

* cited by examiner

*Primary Examiner* — Bai D. Vu
(74) *Attorney, Agent, or Firm* — Amin, Turocy & Watson, LLP

(57) ABSTRACT

This disclosure relates to systems and methods for providing a map-like interface to navigate topics and content.

23 Claims, 16 Drawing Sheets

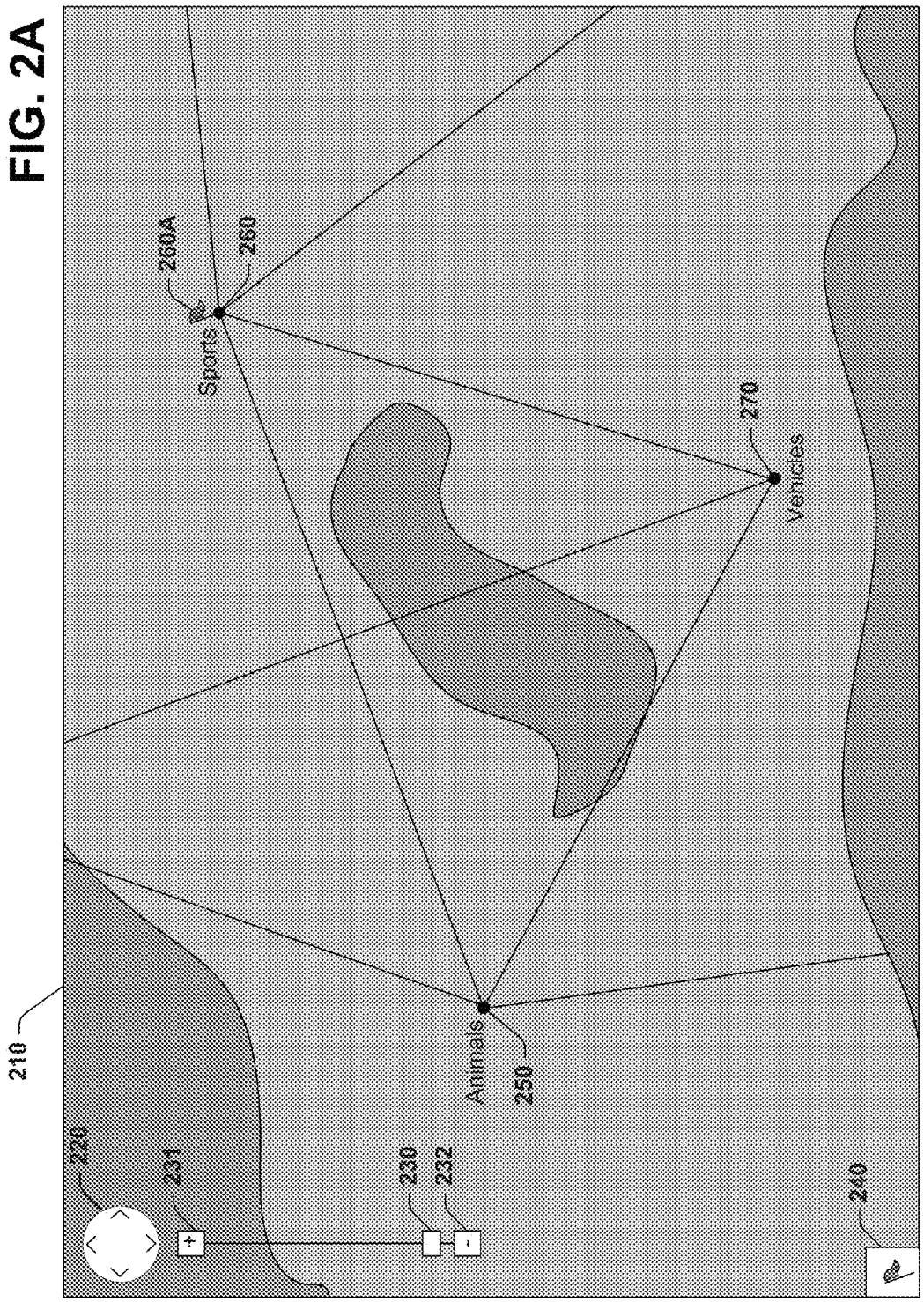

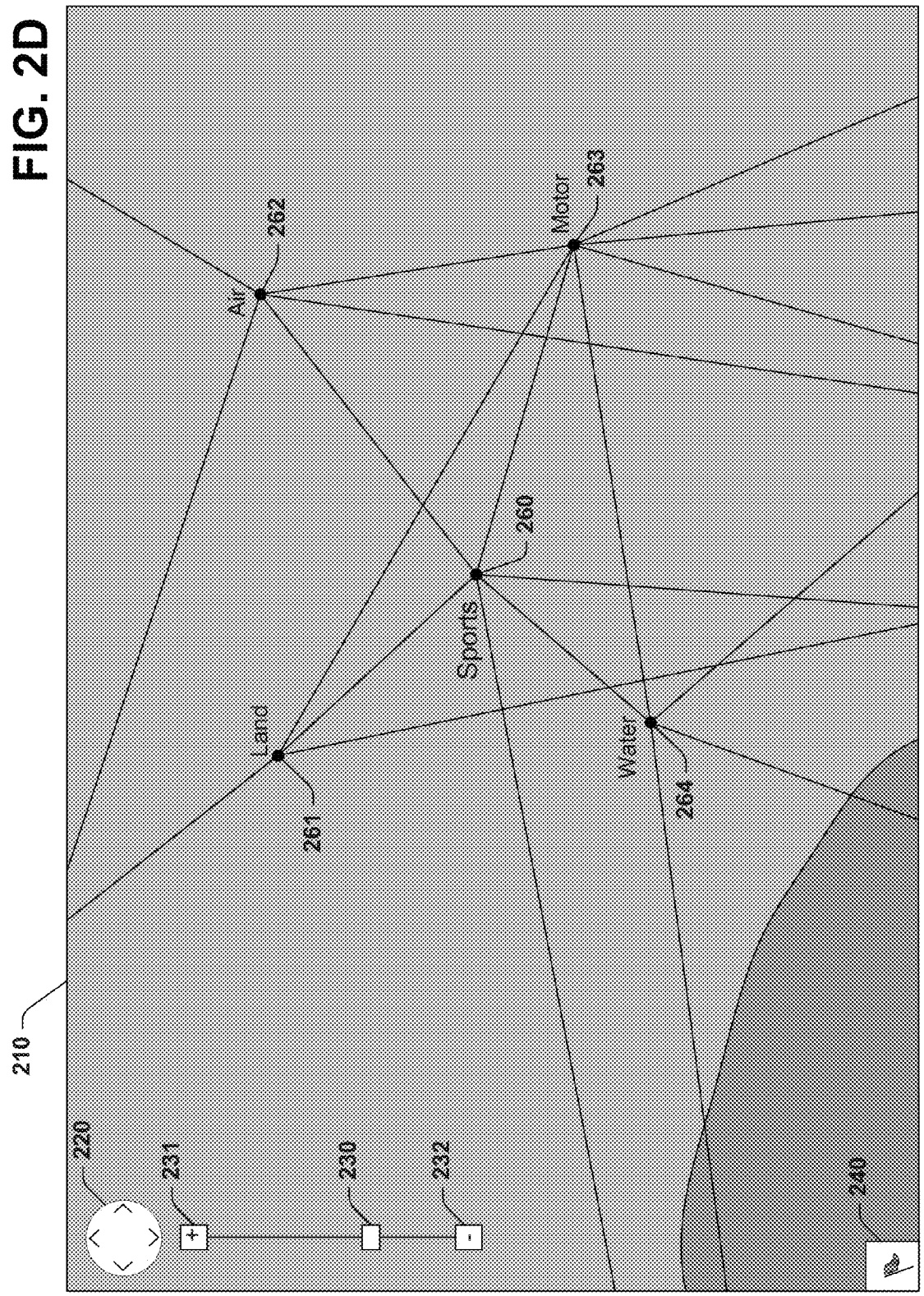

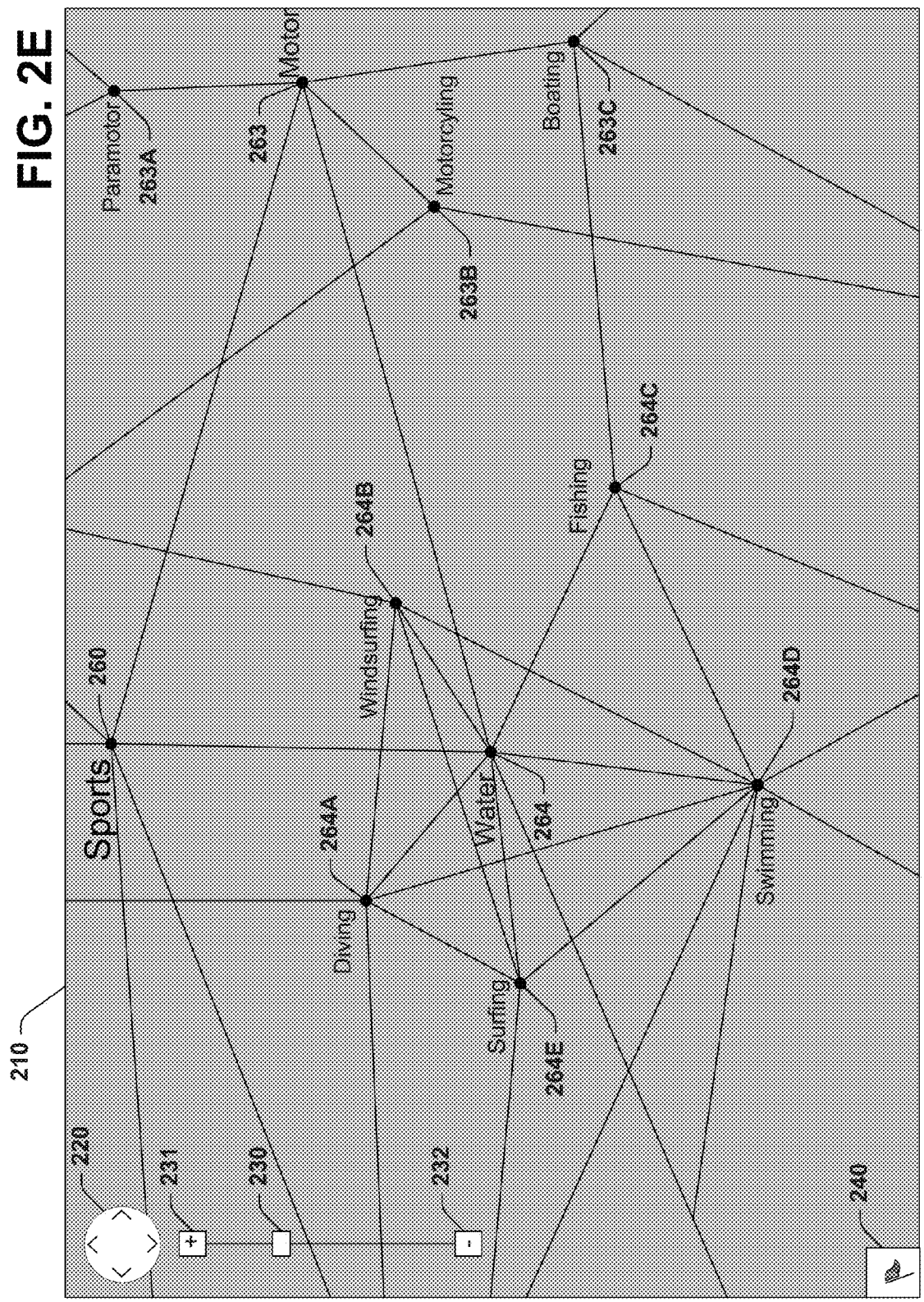

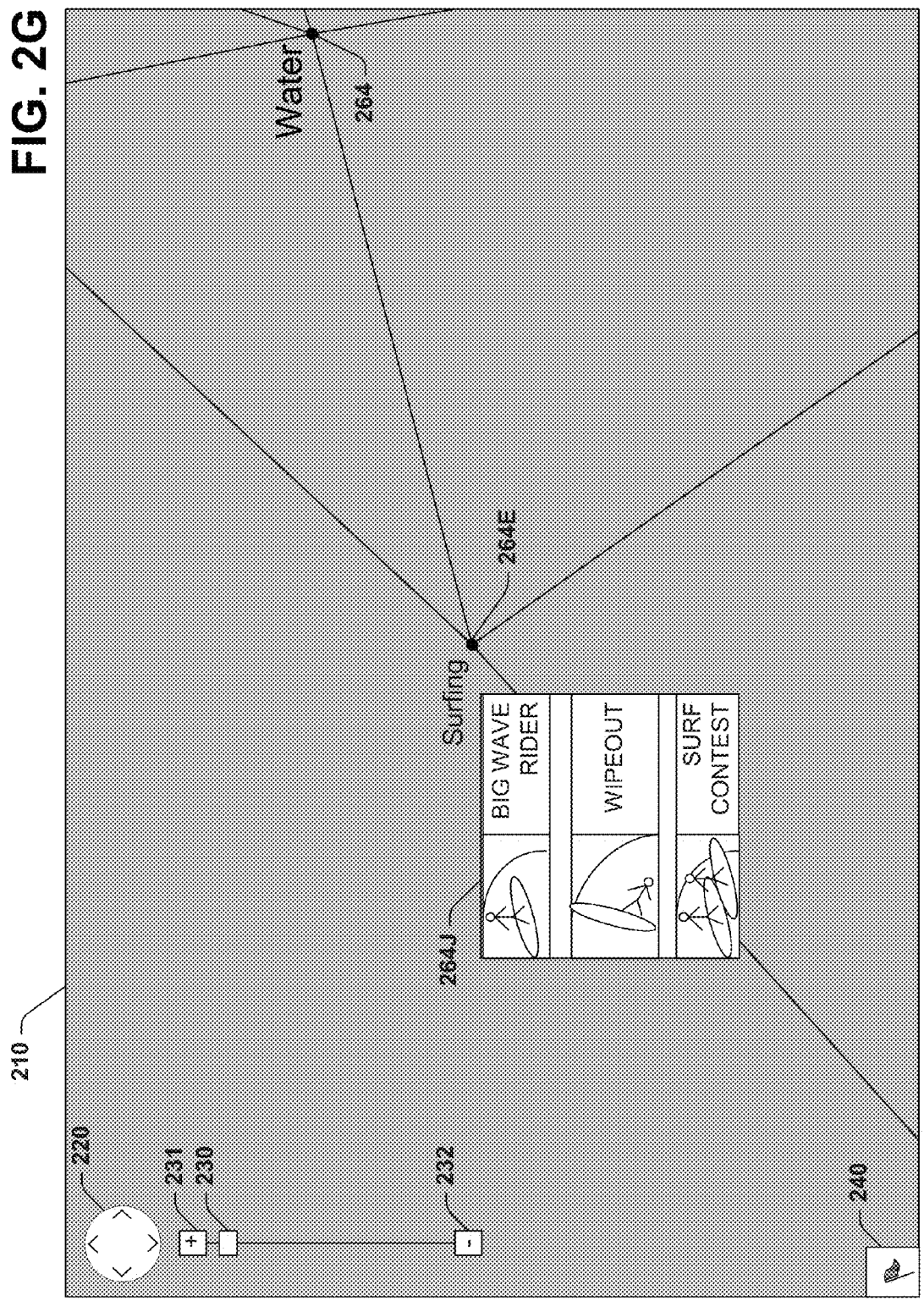

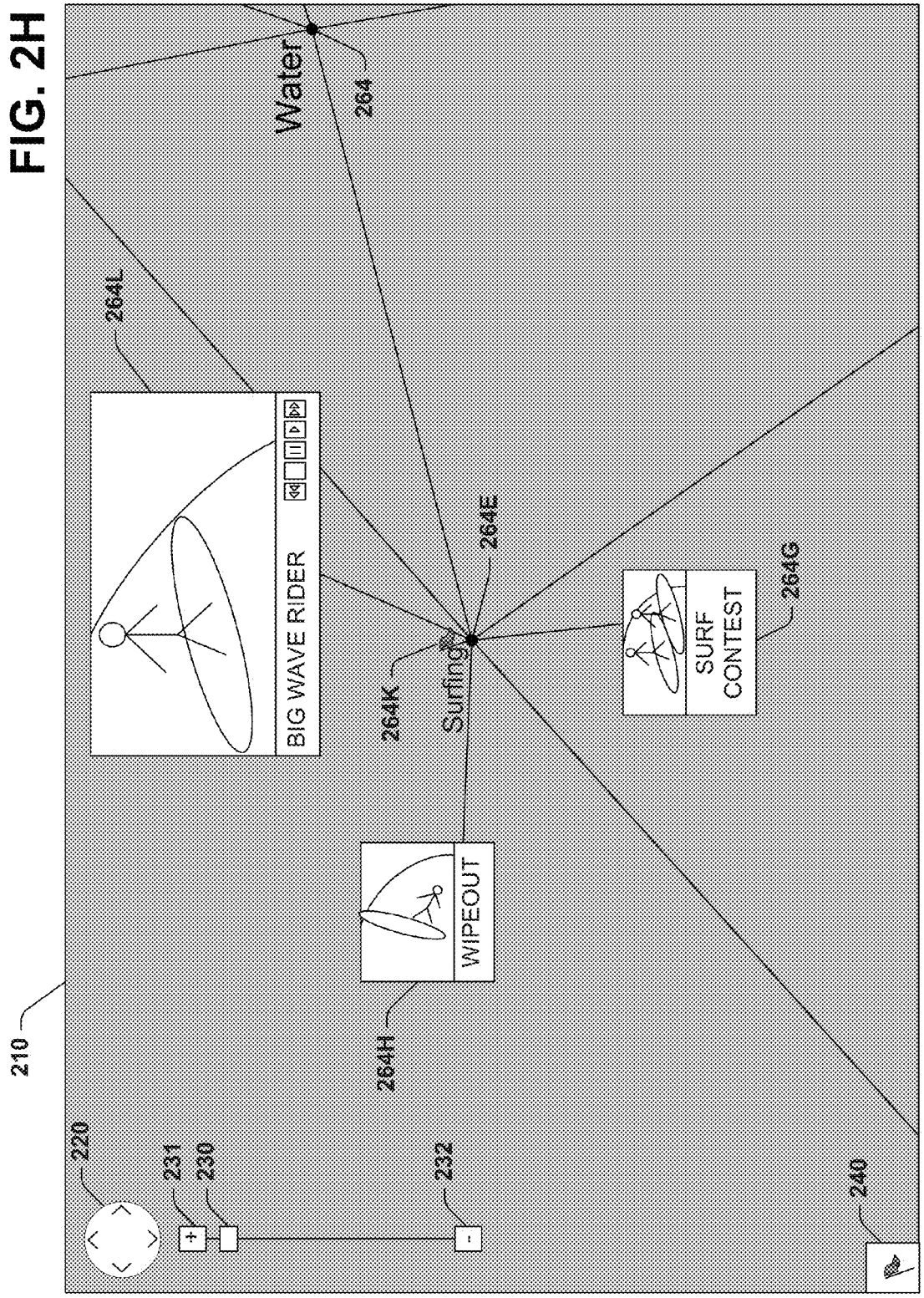

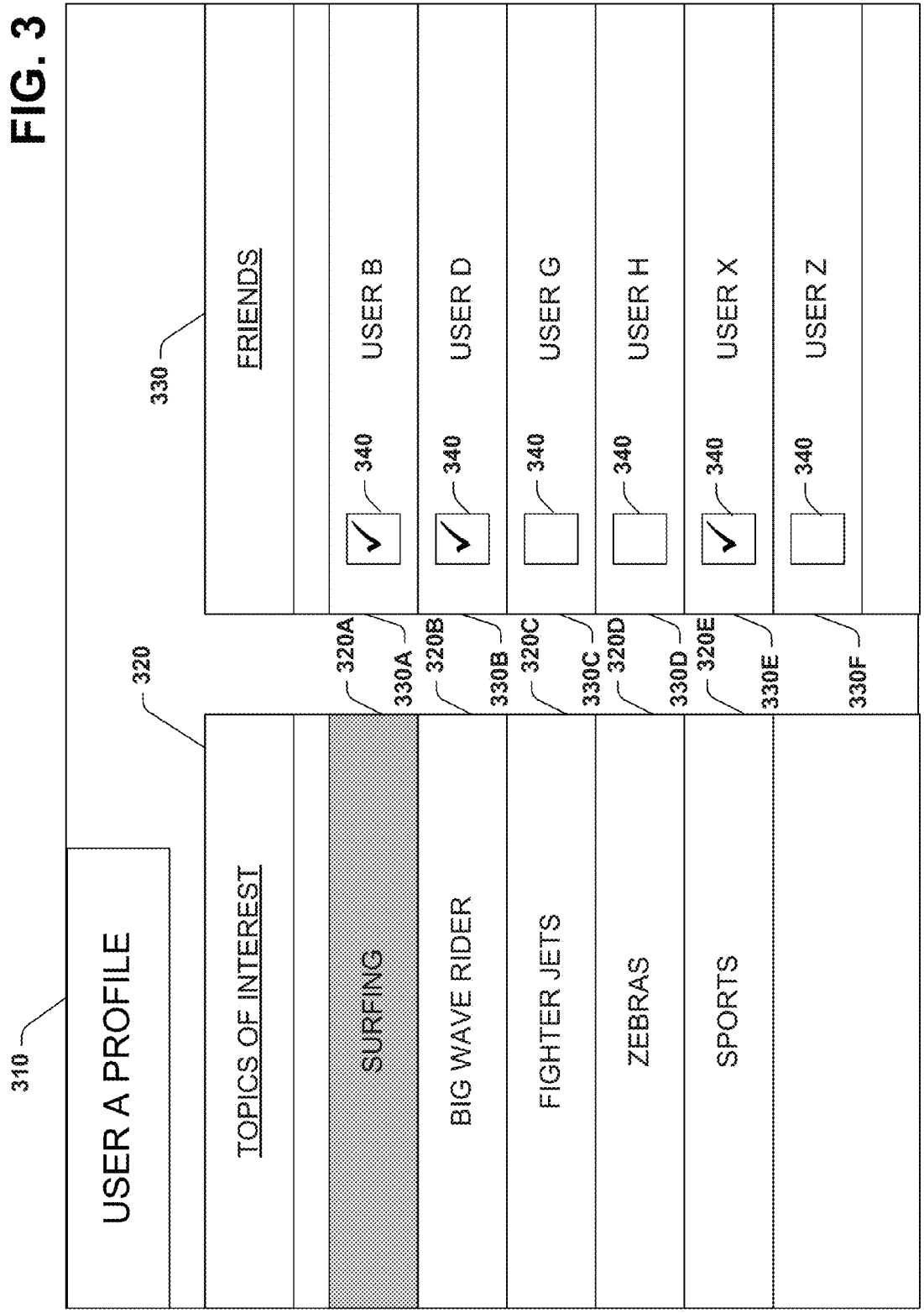

VISUAL DISPLAY OF TOPICS AND CONTENT IN A MAP-LIKE INTERFACE

TECHNICAL FIELD

This disclosure generally relates to systems and methods that facilitate navigating topics and content in a map-like interface.

BACKGROUND

The internet allows individuals and other entities to easily provide content to a large population of content consumers. Vast amounts of content are being published by individuals and entities to content sites, such as social media and social networking sites. For example, individuals with mobile phones can record events and publish videos to a social media site for anyone or a select subset of individuals to view. Furthermore, publishers and consumers can associate information as metadata to the published creative works to search or organize content according to topics of interest. A consumer wanting to explore available content may perform a search on the social media or social networking site to retrieve a list of content that may be of interest. However, when entering a search, a consumer may have trouble articulating a topic of interest. Furthermore, given the vast amount of content available, browsing through topics of interest may be confusing and time-consuming for a consumer.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, a mapping component generates a map of metadata assigned to content based upon a topic-to-topic graph of the metadata, where the metadata appear as nodes on the map and relationships between the metadata appear as links between nodes and a presentation component displays the map.

In accordance with another non-limiting implementation, a map of metadata assigned to content is generated based upon a topic-to-topic graph of the metadata, where the metadata appear as nodes on the map and relationships between the metadata appear as links between nodes, and the map is displayed.

In accordance with a further non-limiting implementation, a map-like interface retrieves a map of metadata associated with content, where the metadata appear as nodes on the map and relationships between the metadata appear as links between nodes, and displays the map.

These and other implementations and embodiments are described in more detail below.

BRIEF DESCRIPTION OF THE DRAWINGS

FIG. 2A illustrates an exemplary non-limiting map-like interface displaying topics and content in a multilayered map in accordance with an implementation of this disclosure.

FIG. 2D illustrates an exemplary non-limiting display of a user having selected the Sports topic from FIG. 2A, in accordance with an implementation of this disclosure.

FIG. 2E illustrates an exemplary non-limiting display of a user having selected the Water topic from FIG. 2D, in accordance with an implementation of this disclosure.

FIG. 2G illustrates an exemplary non-limiting display of a user having selected the Surfing topic from FIG. 2E, wherein a listing of videos associated with the Surfing topic is displayed in accordance with an implementation of this disclosure.

FIG. 2H illustrates an exemplary non-limiting display of a user having selected the Big Wave Rider video thumbnail from FIG. 2E, in accordance with an implementation of this disclosure.

FIG. 3 illustrates an exemplary non-limiting user profile topic of interest interface, in accordance with an implementation of this disclosure.

DETAILED DESCRIPTION

Overview

Figure 1:
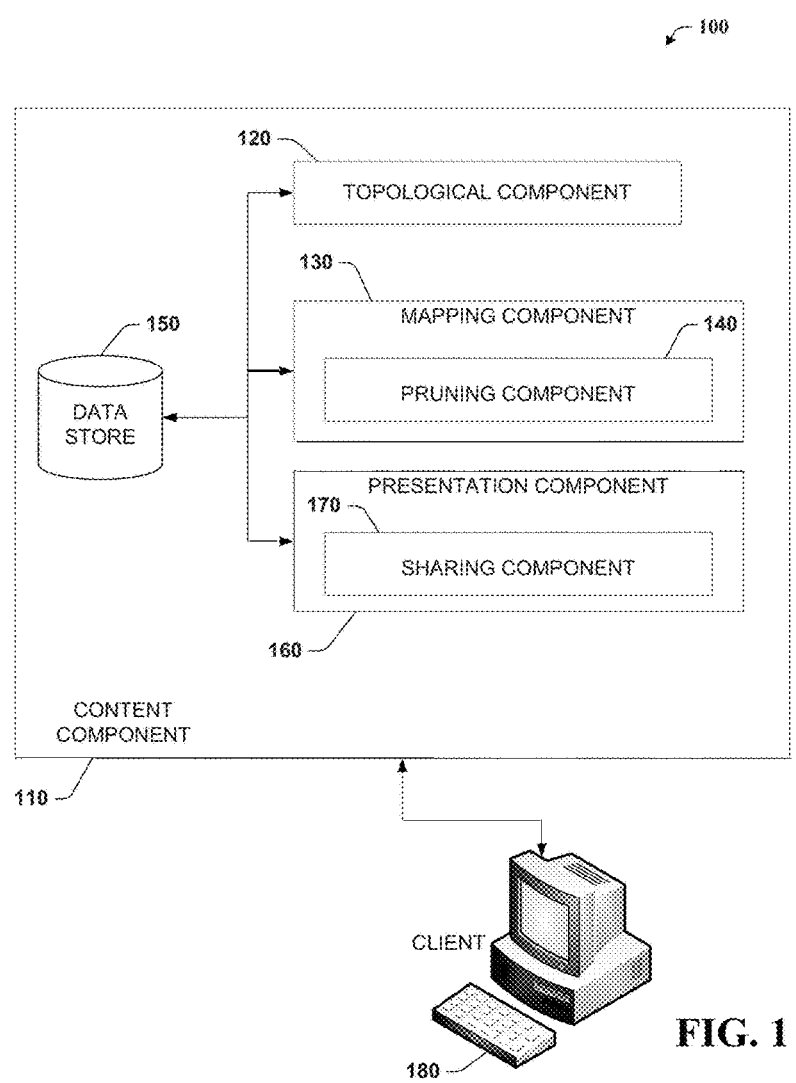
FIG. 1 illustrates a block diagram of an exemplary non-limiting system that provides content to a client using a map-like interface in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In accordance with various disclosed aspects, a map-like interface is provided for navigating topics associated with content. Computer users are typically very familiar with navigation using a map-like interface, such as those provided by various geographical mapping tools available on the internet. As such, organizing and presenting topics associated with content in a map-like interface advantageously provides a familiar interface and navigation to the user. For example, topics can appear as locations on the map and relationships between topics can appear as roads on the map.

Content can include, for example, video, audio, image, text, or any combination thereof, non-limiting examples of which include, music, speeches, cartoons, short films, movies, televisions shows, documents, books, magazines, articles, novels, quotes, poems, comics, advertisements, photos, posters, prints, paintings, artwork, graphics, games, or any other creative work that can be captured and/or conveyed through video, audio, image, text, or any combination thereof. In a non-limiting example, a social media site may contain video content made available to users. In another non-limiting example, a social networking site can contain photo content that users have uploaded to share. A further non-limiting example is a news aggregation site that contains a combination of text articles, videos, photos, and audio recordings. Furthermore, the content can be available on an intranet or internet, or can be local content. For example, local content can be video, audio, image, text, or any combination thereof stored on an individual's personal computer, which may not be made available remotely.

Users, (e.g., publishers or consumers), of the content can associate metadata to the content to provide information describing the content. In a non-limiting example, the information can include any suitable type of metadata that can be employed in connection with the type of content. For example, a musical recording can include metadata such as title, artist, album, year, track genre, length, composer, lyrics, parental rating, album art, etc. One skilled in the art would readily recognize that, based on the type of content, there are well known metadata types that are conventionally associated. However, the information is not limited to only such traditional metadata types. Any type of information can be associated with the content. For example, user comments, likes, dislikes, ratings, tags, and keywords are additional non-limiting examples of information that can be added as metadata to content. Moreover, information can be associated with content automatically by intelligent components, of which non-limiting examples include, image analysis, audio analysis, optical character recognition, facial recognition, object recognition, scene recognition, voice recognition, speech-to-text conversion, and media fingerprint matching.

In one or more non-limiting embodiments described below, disclosed are aspects relating to utilizing relationships between metadata associated with content to provide a map-like interface to navigate topic in the metadata and view associated content.

Referring now to the drawings, FIG. 1 depicts a system 100 that provides content to client 180. System 100 includes a content component 110 that makes content available to client 180 locally or remotely. Furthermore, content component 110 can receive input from client 180 to control interaction with and presentation of content.

Figure 9:
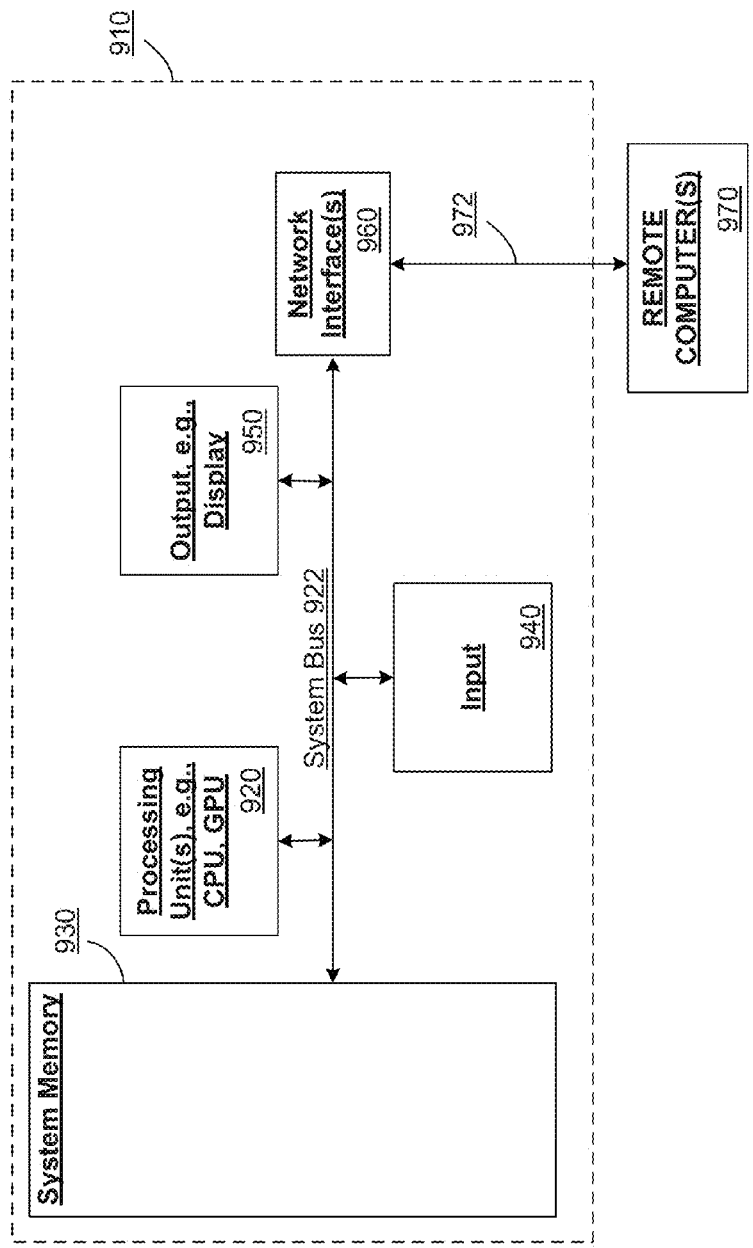
FIG. 9 is a block diagram representing an exemplary non-limiting computing system or operating environment in which various embodiments may be implemented.

Content component 110 includes a memory that stores computer executable components and a processor that executes computer executable components stored in the memory, a non-limiting example of which can be found with reference to FIG. 9. In one implementation, content component 110 can be incorporated into client 180. Alternatively, content component 110 can be located on a server communicating via a network to client 180. It is to be appreciated that while only one client 180 is depicted interacting with content component 110, there can be any suitable number of clients 180 accessing content from content component 110, and content component 110 can communicate content to a plurality of clients 180 concurrently. Furthermore, content and associated metadata may be stored local to content component 110 or may be stored remotely from content component 110.

Content component 110 includes a topological component 120 that determines relationships between the metadata associated with content. Content component 110 further includes a mapping component 130 that generates a map of topics in the metadata. In addition, content component 110 includes a presentation component 160 that presents a map-like interface of the map of topics to client 180. Additionally, content component 110 includes a data store 150 that can store content and associated metadata, as well as, data generated by topological component 120, mapping component 130, and presentation component 160. Data store 150 can be stored on any suitable type of storage device, non-limiting examples of which are illustrated with reference to FIGS. 8 and 9.

While shown as a personal computer for simplicity, client 180 can be any suitable type of device for interacting with content locally, or over a wired or wireless communication link. Non-limiting examples of client 180 include a mobile phone, personal data assistant, laptop computer, tablet computer, desktop computer, server system, cable set top box, satellite set top box, cable modem, television set, media extender device, blu-ray device, DVD (digital versatile disc or digital video disc) device, compact disc device, video game system, audio/video receiver, radio device, portable music player, navigation system, car stereo, etc. Moreover, client 180 can include a user interface (e.g., a web browser or application) that can receive and present displays generated by presentation component 160.

With continued reference to FIG. 1, topological component 120 produces a graph of topic-to-topic relationships between metadata. Relationships between metadata can be identified by users and/or by automated components. In a non-limiting example, a user can indicate that an individual in a photo is associated with a particular sport, or that two vehicles provide similar performance and are favorites of a particular race car driver. In another non-limiting example, topological component 120 can analyze the metadata and/or user interaction with the metadata to infer relationships between metadata. For example, topological component 120 can examine data about users interaction with content to determine that users who watch videos that have associated metadata indicating "rodeo" also frequently listen to music having associated metadata indicating a genre of "country". Thus, topological component 120 can infer a relationship between "rodeo" and "country". Furthermore, topological component 120 can employ predefined categorizations and/or hierarchies of metadata, or user prioritization and/or indications of relationships between metadata. In addition, topological component 120 can assign relationship weights, indicative of the strength of the relationship, to relationships between metadata based upon indications from users and/or inference. Additionally, topological component 120 can assign popularity weights, indicative of popularity to users, to topics in the metadata based upon indications from users and/or inference. Topological component 120 employs the relationships between metadata to generate a graph of topic-to-topic relationships, where nodes in the graphs are topics in the metadata, for example "rodeo" and "country", and links between nodes are relationships between topics. Furthermore, the links can provide an indication of the relationship weight and nodes can provide an indication of popularity weight of the associated topic.

Mapping component 130 includes a pruning component 140 which may optionally be employed to prune the topic-to-topic graph, for example, to remove nodes associated with less popular topics. For example, the topic-to-topic graph may be very large and in order to decrease the size of the graph, for example for performance and/or storage requirements, the graph may be pruned. In a non-limiting example, a popularity threshold can be defined such that nodes with a popularity weight that does not meet the threshold are removed from the graph. The popularity threshold can be predefined, or can be dynamically adjusted, for example, to limit the graph to a size based upon current performance and/or storage requirements. In another non-limiting example, based upon the number of clients 180 that are interacting with content component 110, the system can adjust the popularity threshold so that clients 180 interactions with content component 110 meet a particular performance requirement such that users do not perceive a delay in navigating topics or receiving content. Furthermore, pruning can be based upon other criteria, non-limiting examples of which include, user prioritization of topics, user specified topics of interest, inferred topics of interest, and shared topics of interest. For example, topics that a user has prioritized below a threshold can be pruned. In another example, topics for which the user has specified an interest, which have been inferred to be of interest to the user, or which have been shared by other users can be restricted from being pruned.

Mapping component 130 can identify the largest connected component in the topic-to-topic graph and discards nodes and links not connected to the largest connect component. Mapping component 130 employs a graphing algorithm to generate a two-dimensional graph by projecting the largest connected component on a two-dimensional plane such that each node of the topic-to-topic graph has a two-dimensional coordinate relative to each other indicating the closeness of relationship between topics. For example, the topic "rodeo" may have a two-dimensional coordinate that is close to the two-dimensional coordinate of the topic "country" but far from the two-dimensional coordinate of the topic "hip-hop". Non-limiting examples of graphing algorithms include, Isomap, force-directed graph layout, principal component analysis, and multi-dimensional scaling. Mapping component 130 adds links between two-dimensional coordinates of topic nodes in the two-dimensional graph corresponding to links between topic nodes in the topic-to-topic graph.

Mapping component 130 can generate a map with a plurality of map layers corresponding to varying scales of the map at differing levels of zooming. At each layer, mapping component 130 selects topics for inclusion in the layer. Mapping component 130 can apply varying criteria for determining which topics to include in a layer such that at each layer corresponding to a zooming in from top layer to a bottom layer, additional topics are added to the topics included in a higher layer. In a non-limiting example, predefined rules can be employed for determining topics to include in each layer. For example, popularity weight for topics can be determining criteria such that at a top layer the more popular topics are included and at each subsequent lower layer additional topics are added in decreasing popularity. In another non-limiting example, mapping component 130 can employ user preferences stored in a user profile and/or inferred based upon user interaction with the content component 110 to determine topics of interest to a user such that more interesting topics are included in higher layers. For example, past interaction with topics or content can indicate a user's interest in particular topics or content. Mapping component 130 can examine data about user interaction with topics and content, which can include, as authorized by a user, searches, navigation of a map-like interface of topics, viewing content, browsing topics, rating topics or content, like indication of topics or content, dislike indication of topics or content, and comments or annotations applied to topics or content. It is to be appreciated that any criteria can be employed for determining which topics to include in each layer. In addition, topics of interest specified by a user or inferred by mapping component 130 can be stored in/with a user profile associated with the user. Furthermore, topic thresholds can be defined at layers limiting the number of topics that are included in a layer to prevent overcrowding the display of topics in the map-like interface for the layer.

Mapping component 130 can employ the thresholds to determine topics to include in a layer, for example, by ranking the topics according to the varying criteria and using the thresholds as cutoffs for topic inclusion in a layer. In a non-limiting example, a top layer may have a topic threshold of fifty and mapping component 130 can include the fifty highest ranked topics from the ranked list in the top layer. Mapping component 130 generates a visual depiction for each layer displaying the topics in the layer, geographical land mass around the topics, and roads corresponding to relationship links between topics. It is to be understood that while embodiments herein refer to visual depiction of a map metaphor in the form of a geographical road map, the design of the map style is an artistic choice that can be infinitely variable, for example, colors, borders, aesthetic enhancements such as trees, rivers, lakes, mountains, etc. can be changed or added.

Continuing with reference to FIG. 1, presentation component 160 provides a map-like interface for navigating and viewing topics and content. Presentation component 160 can receive input via input devices, non-limiting examples of which are illustrated with reference to FIGS. 8 and 9. In a non-limiting example, presentation component 160 can display the multilayer map with topics appearing as locations on a geographical map and relationships between topics appearing as roads on the geographical map. Furthermore, presentation component 160 can display an indication of popularity weight associated with a topic and/or relationship weight for a relationship between topics. In a non-limiting example, the indication can be depicted using text, graphical, numerical, color, shading, size, length, and/or thickness to convey relative weight associated with topics and relationships. For example, topics with greater popularity weight can be depicted using a larger font and relationships with greater weight can be depicted using roads having greater thickness.

Referring to FIG. 2A, an exemplary map-like interface 210 is presented by presentation component 160 for displaying a multilayered map of topics and content. Map-like interface 210 includes panning control 220 that allows for user control of panning the displayed map. In a non-limiting example, pressing the up arrow on panning control 220 moves north in the map, pressing the down arrow on panning control 220 moves south in the map, pressing the right arrow on panning control 220 moves east in the map, and pressing the left arrow on panning control 220 moves west in the map. It is to be understood that other mechanisms for panning control are within the scope of the map-like interface 210, non-limiting examples of which include, click and dragging using a cursor and input device, and eye focus tracking based panning. Eye focus tracking monitors a user's eye movement to determine an area of the map on which the user is looking. In a non-limiting example, the map can be panned to move the area in which the user is looking to the center of the display.

Map-like interface 210 includes zoom slider control 230 that allows for user control of zooming within the displayed map. In a non-limiting example, moving zoom slider control 230 up zooms into the map showing lower layers and moving zoom slider control 230 down zooms out of the map showing higher layers. Map-like interface 210 includes zoom in control 231 that allows for user control of zooming into the displayed map. For example, selection of zoom in control 231 causes the displayed map to zoom in showing lower layers of the map. Map-like interface 210 includes zoom out control 232 that allows for user control of zooming out of the displayed map. For example, selection of zoom out control 232 causes the displayed map to zoom out showing higher layers of the map. It is to be understood that other mechanisms for zooming control are within the scope of the map-like interface 210, non-limiting examples of which include, click select using a cursor and input device, and eye focus tracking based zooming. Eye focus tracking monitors a user's eye movement to determine an area of the map on which the user is looking and has maintained focus for a predetermined period of time. In a non-limiting example, a topic on which the user is focusing for a certain period of time can be selected to zoom in the map on the selected topic.

Map-like interface 210 includes interest marking control 240 that allows for user setting their preference of topics of interest. For example, selection of interest marking control 240 allows a user to place a marker of interest 260A on a topic. In the depicted example, a marker of interest 260A has been placed on Sports topic 260. In a non-limiting example, a user can select and drag interest marking control 240 onto the topic of interest to set marker of interest 260A. In another non-limiting example, a user can select interest marking control 240 and then click on a topic using an input device to set marker of interest 260A. It is to be understood that other mechanisms for setting a marker of interest 260A on a topic are within the scope of the map-like interface 210, a non-limiting example of which is to right click on a topic to bring up a menu that allows for selecting of a menu item for set marker of interest 260A on the topic.

Continuing with reference to FIG. 2A, zoom slider control 230 is near the bottom of the slider indicating a map display of a higher layer depicting Animals topic 250, Sports topic 260, and Vehicle topic 270 and roads indicating the relationships between the topics. Additionally, there are roads displayed from the topics which lead off of the display indicating relationships between the topics and topics that are not visible in the display but are present in the map layer.

Figure 2B:
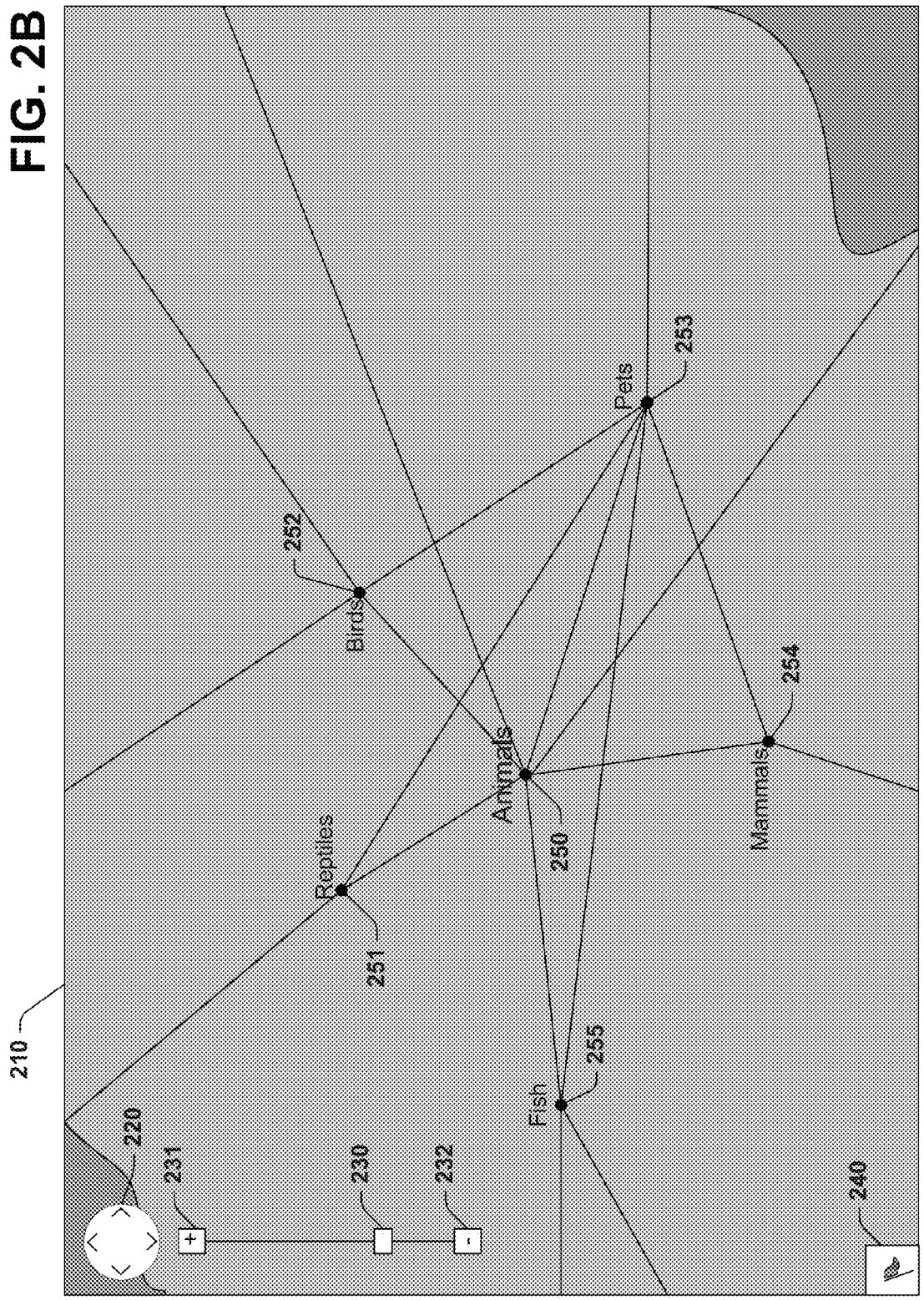
FIG. 2B illustrates an exemplary non-limiting display of a user having selected the Animals topic from FIG. 2A, in accordance with an implementation of this disclosure.

Referring to FIG. 2B, an example display of a user having selected Animals topic 250 from FIG. 2A is depicted. Zoom slider control 230 has moved up the slider indicating that the map is displaying a zoomed in view and Animals topic 250 has moved near to the center indicating that the zoomed in view is focused on Animals topic 250. In addition, additional topics and roads are displayed showing the relationships between the topics. For example, Reptiles topic 251, Birds topic 252, Pets topic 253, Mammals topic 254, and Fish topic 255 are displayed along with roads showing the relationships amongst them and their relationship to Animals topic 250.

Figure 2C:
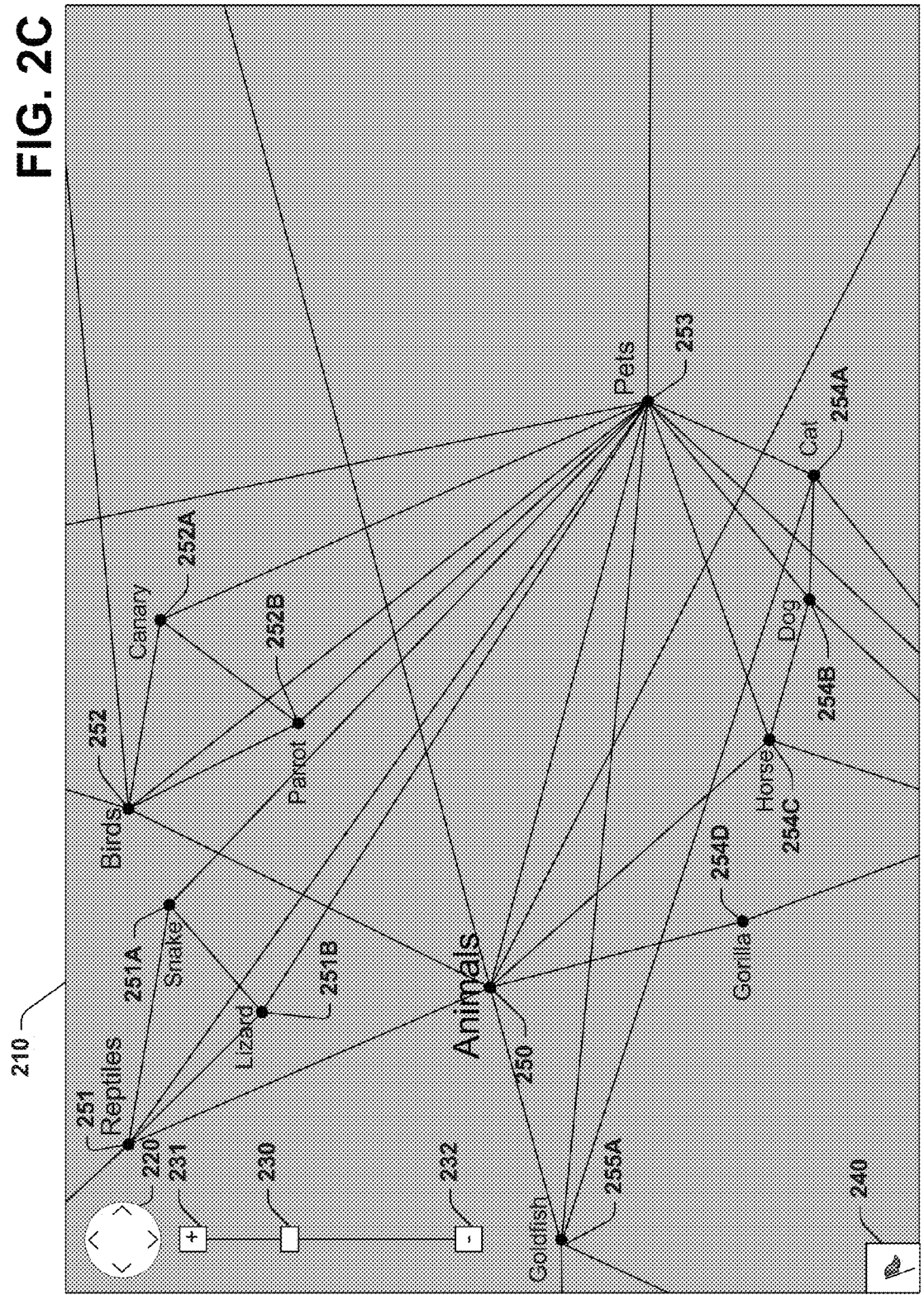
FIG. 2C illustrates an exemplary non-limiting display of a user having selected the Pets topic from FIG. 2B, in accordance with an implementation of this disclosure.

Referring to FIG. 2C, an example display of a user having selected Pets topic 253 from FIG. 2B is depicted. Zoom slider control 230 has moved further up the slider indicating that the map is displaying a zoomed in view and Pets topic 253 has moved closer to the center indicating that the zoomed in view is focused on Pets topic 253. Reptiles topic 251, Birds Topic 252, and Animals topic 250 have moved towards the edge of the display. Additionally, Snake topic 251A, Lizard Topic 251B, Canary topic 252A, Parrot topic 252B, Cat topic 254A, Dog topic 254B, Horse topic 254C, Gorilla topic 254D, and Goldfish topic 255A are displayed along with roads showing the relationships amongst the topics. For example, a road links Pets topic 253 to Cat topic 254A indicating a relationship between the topic. However, there is not a direct road between Pets topic 253 and Gorilla topic 254D indicating that, based on the content analyzed (e.g., video content), there is no direct relationship between the topics.

Referring to FIG. 2D, an example display of a user having selected Sports topic 260 from FIG. 2A is depicted. Zoom slider control 230 has moved up the slider indicating that the map is displaying a zoomed in view and Sports topic 260 has moved near to the center indicating that the zoomed in view is focused on Sports topic 260. In addition, Land topic 261, Air topic 262, Motor topic 263, Water topic 264, and roads, showing the relationships between the topics, are displayed. For example, Land topic 261, Air topic 262, and Water topic 264 do not have direct roads between them indicating that there is not a direct relationship between them based on the content analyzed. However, Land topic 261, Air topic 262, and Water topic 264 are connected indirectly to each other through Sports topic 260 and Motor topic 263.

Referring to FIG. 2E, an example display of a user having selected Water topic 264 from FIG. 2D is depicted. Zoom slider control 230 has moved further up the slider indicating that the map is displaying a zoomed in view and Water topic 264 has moved closer to the center indicating that the zoomed in view is focused on Water topic 264. Sports topic 260 and Motor topic 263 have moved towards the edge of the display. Additionally, Paramotor topic 263A, Motorcycling topic 263B, Boating topic 263C, Diving topic 264A, Windsurfing topic 264B, Fishing topic 264C, Swimming topic 264D, and Surfing topic 264E are displayed along with roads showing the relationships amongst the topics. For example, a road links Fishing topic 264C to Boating topic 263C indicates a relationship between the topics. However, there is not a direct road between Fishing topic 264C and Paramotor topic 263A indicating that there is no direct relationship between the topics based on the content analyzed.

Figure 2F:
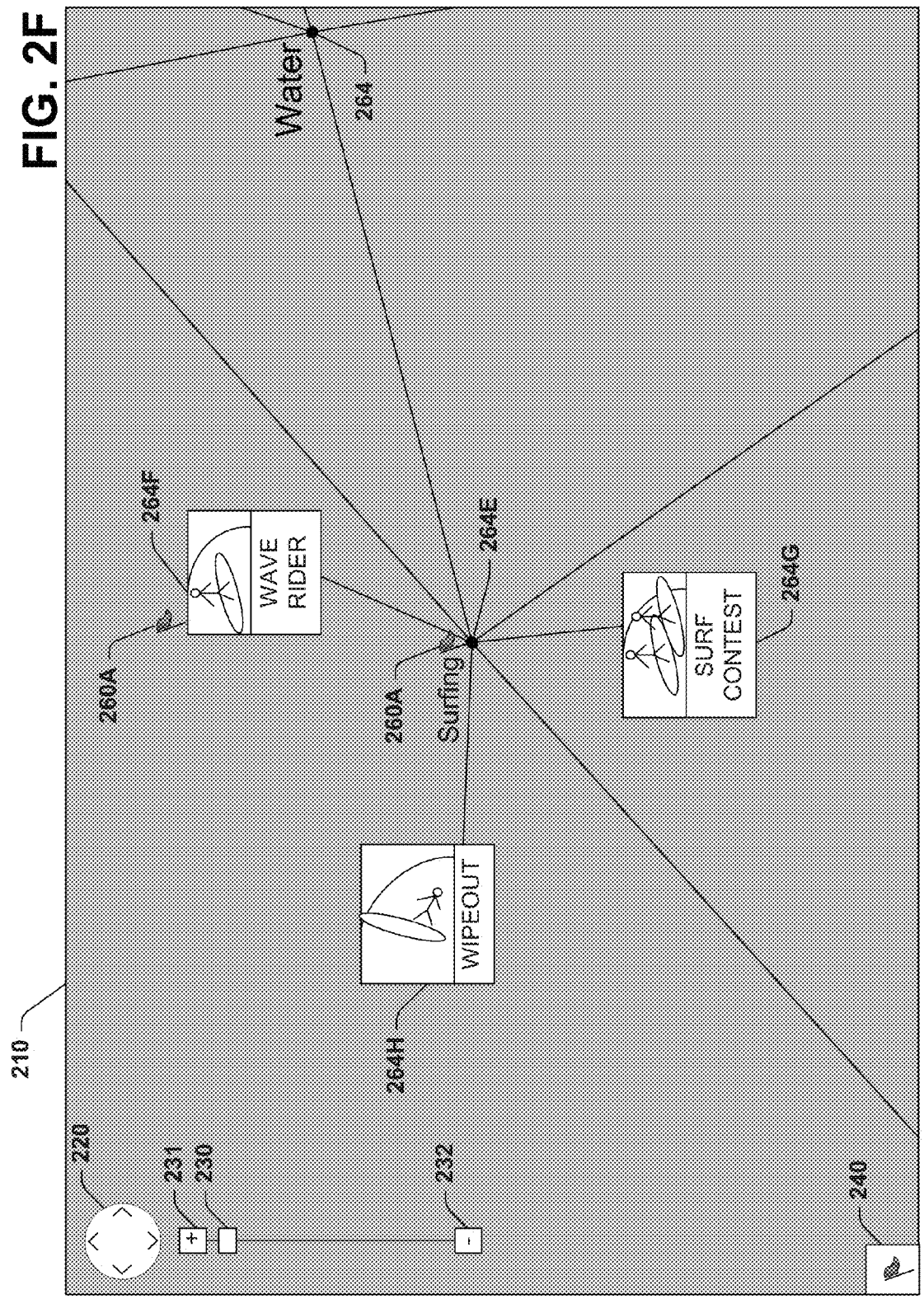
FIG. 2F illustrates an exemplary non-limiting display of a user having selected the Surfing topic from FIG. 2E, wherein thumbnails of videos associated with the Surfing topic is displayed in accordance with an implementation of this disclosure.

Referring to FIG. 2F, an example display of a user having selected Surfing topic 264E from FIG. 2E is depicted. Zoom slider control 230 has moved near the top of the slider indicating that the map is displaying a zoomed in view showing a lower layer of the map and Surfing topic 264E has moved closer to the center indicating that the zoomed in view is focused on Surfing topic 264E. Additionally, in FIG. 2F, content associated with the topic is depicted. In the example display, thumbnails for Big Wave Rider video 264F, Surf Contest video 264G, and Wipeout video 264H are depicted along with roads connecting the thumbnails to Surfing topic 264E. It is to be understood that thumbnails are a non-limiting example of how content can be displayed on the map. FIG. 2G is an example display of a user having selected Surfing topic 264E from FIG. 2E where a listing of videos 264J associated with Surfing topic 264E is displayed. Other mechanisms for presenting content along with a topic are within the scope of the map-like interface 210, non-limiting examples of which include, graphical icons, text, menus, and/or embedded video objects. It is also to be understood that, content can displayed with topics at any layer of the map. Referring back to FIG. 2F, markers of interest 260A are depicted with Surfing topic 264E and Big Wave Rider video thumbnail 264F. As discussed above, markers of interest 260A can be set by a user. Additionally, markers or interest 260A can be placed on the map by presentation component 160 based upon inferred topics of interest for a user by mapping component 130 as also discussed above.

Referring to FIG. 2H, an example display of a user having selected Big Wave Rider video thumbnail 264F from FIG. 2F is depicted. A video console 264L is displayed on the map showing the Big Wave Rider video associated with Big Wave Rider video thumbnail 264F. While this example depicts the video playing within map-like interface 210, it is to be understood that the video can be displayed in a separate window, user interface, or device from the map-like interface 210.

Referring back to FIG. 1, presentation component 160 includes a sharing component 170 that enables users to share topics of interest in their profiles with other users. In a non-limiting example, a user can selectively choose to share all or a portion of their user profile with one or more other users.

Referring to FIG. 3, an exemplary user profile topic of interest interface 310 is shown. The interface 310 may be presented by sharing component 170, for example. The user profile topic of interest interface 310 allows a user to select their topics of interest to share with their friends, contacts, network, etc. In this example, user profile topic of interest interface 310 includes listing of topics of interest 320 and listing of friends 330 for USER A. Listing of topics of interest 320 includes topics of interest Surfing 320A, Big Wave Rider 320B, Fighter Jets 320C, Zebras 320D, and Sports 320E. Listing of friends 330 includes USER B 330A, USER D 330B, USER G 330C, USER H 330D, USER X 330E, and USER Z 330F each with a selection element 340. In this example, topics of interest Surfing 320A is selected as indicated by the darker shading of this topic of interest. Furthermore, friends USER B 330A, USER D 330B, and USER X 330E are selected as indicated by the checkmark in the selection box, thereby providing for sharing of the topic of interest Surfing 320A by USER A to USER B 330A, USER D 330B, and USER X 330E. USER A can select selection elements 340 corresponding to the users for which he/she would like to share selected topics of interest. It is to be understood that other user interface mechanisms for sharing information in a user profile with other users are within the scope of user profile topic of interest interface 310 for indicating topics of interest that are shared or to be shared with other users.

FIGS. 4-7 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Figure 4:
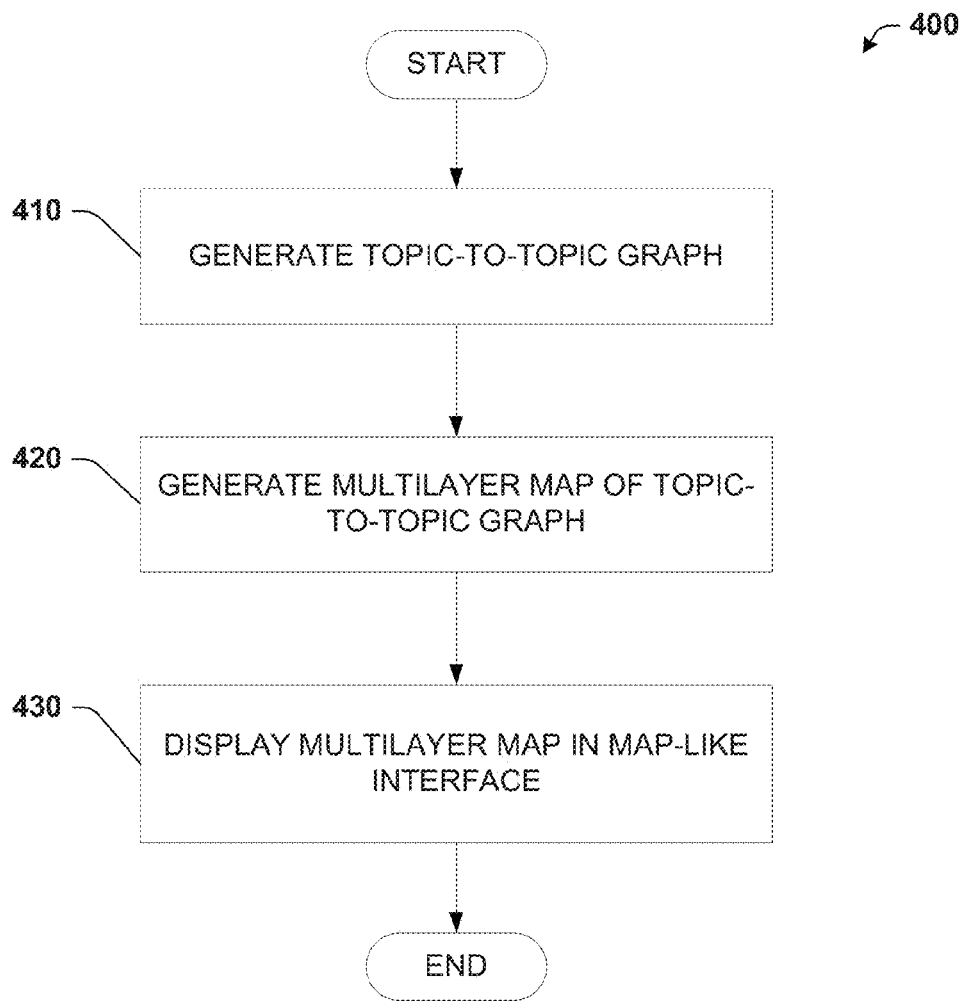
FIG. 4 is an exemplary non-limiting flow diagram for displaying topics and associated content in a map-like interface, in accordance with an implementation of this disclosure.

Referring to FIG. 4, an exemplary method 400 for displaying topics and associated content in a map-like interface. At reference numeral 410, a topic-to-topic graph of metadata associated with content is generated (e.g. by a topological component 120). At reference numeral 420, a multi-layered map is generated based upon a two-dimensional graph of the topic-to-topic graph (e.g. by a mapping component 130). At reference numeral 430, a map-like interface is presented displaying the multi-layered map (e.g. by a presentation component 160).

Figure 5:
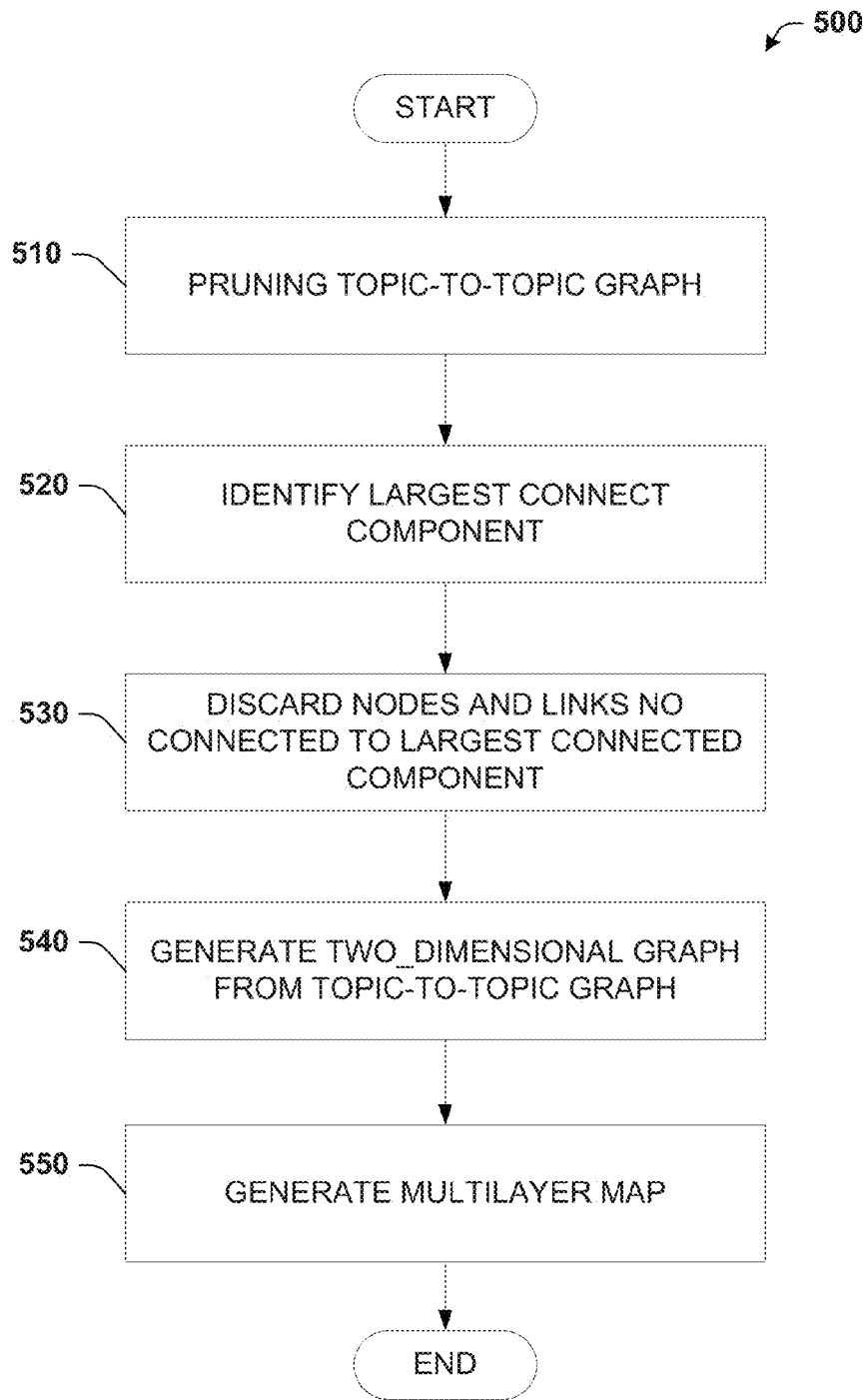
FIG. 5 is an exemplary non-limiting flow diagram for generating a multilayer map from a topic-to-topic graph, in accordance with an implementation of this disclosure.

Referring to FIG. 5, an exemplary method 500 for generating a multilayer map from a topic-to-topic graph is depicted. At reference numeral 510, a topic-to-topic graph is pruned (e.g. using a pruning component 140). It is to be understood that pruning of the topic-to-topic graph can be an optional step selectively implemented based on criteria as discussed above. At reference numeral 520, a largest connected component is identified in the topic-to-topic graph (e.g. using a mapping component 130). At reference numeral 530, nodes and links in the topic-to-topic graph that are not connected to the largest connected component are discarded (e.g. using a mapping component 130). At reference numeral 540, the largest connected component of the topic-to-topic graph is projected onto a two-dimensional space to generate a two-dimensional graph (e.g. using a mapping component 130). At reference numeral 550, a map with a plurality of map layers corresponding to varying scales of the map at differing levels of zooming is generated from the two-dimensional graph (e.g. using a mapping component 130).

Figure 6:
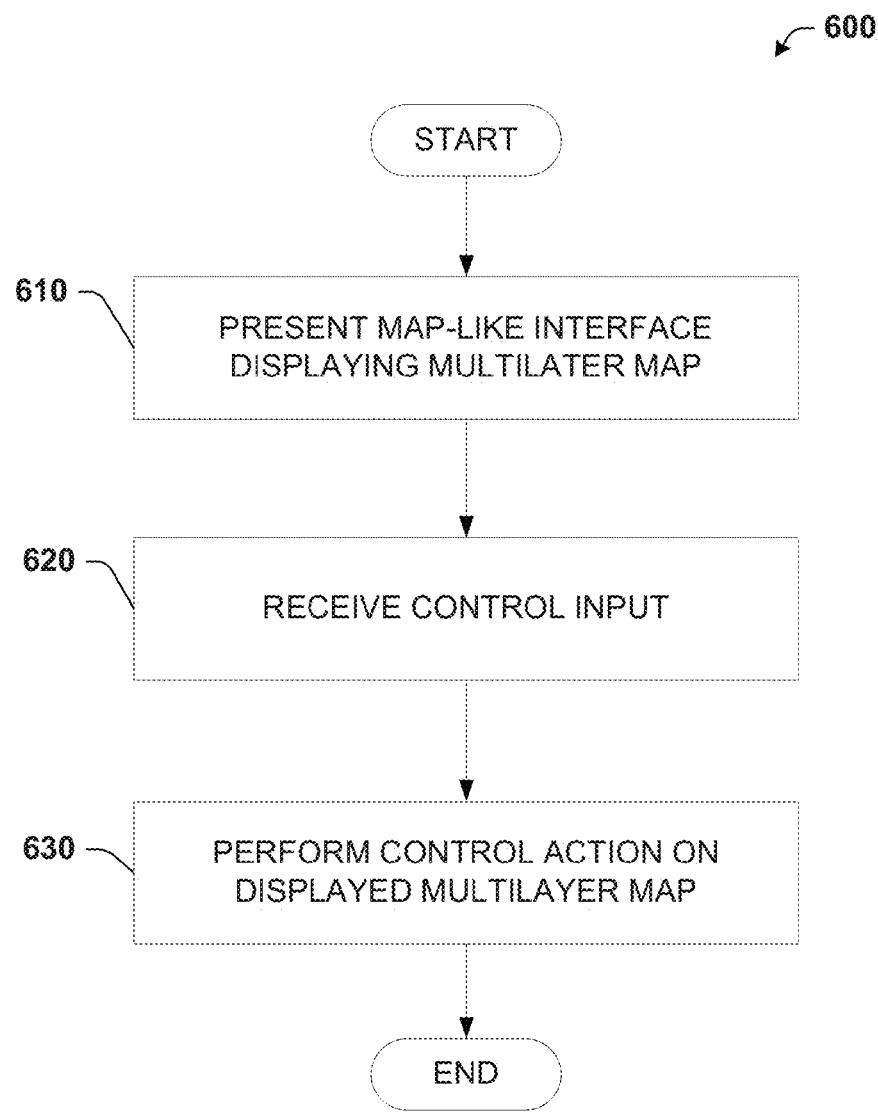
FIG. 6 is an exemplary non-limiting flow diagram for presenting and navigating topics and content in a map-like interface, in accordance with an implementation of this disclosure.

Referring to FIG. 6, an exemplary method 600 for presenting and navigating topics and content in a map-like interface is depicted. At reference numeral 610, a map-like interface is presented displaying a multilayered map of topics and content (e.g. using a presentation component 160). At reference numeral 620, a control input is received indicating a control action to perform with the displayed multilayered map, non-limiting examples of which can include zooming, panning, marking of interest, topic selection, content selection, and content viewing control, such as pause, stop, play, fast forward, rewind (e.g. using a presentation component 160). At reference number 630, the display of the multilayer map is adjusted according to the control action (e.g. using a presentation component 160).

Figure 7:
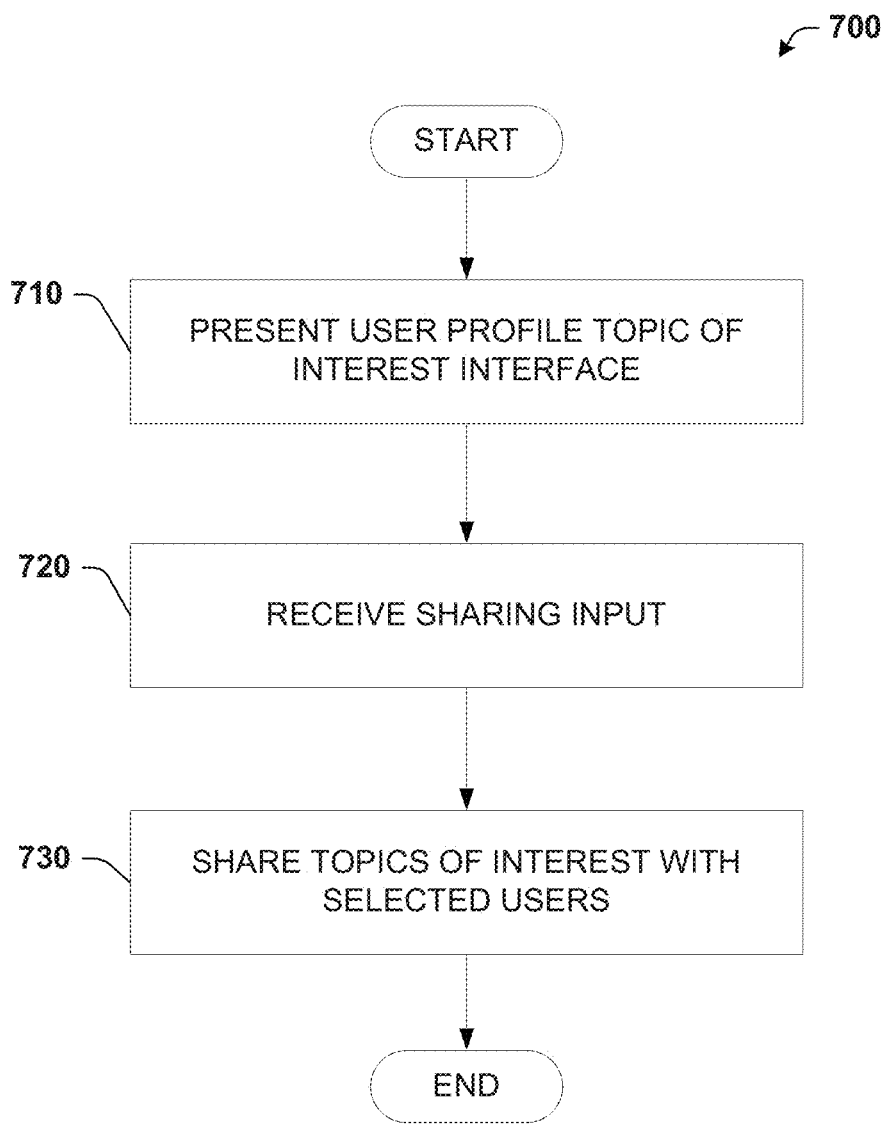
FIG. 7 is an exemplary non-limiting flow diagram for sharing topics of interest between users, in accordance with an implementation of this disclosure.

Referring to FIG. 7, an exemplary method 700 for sharing topics of interest between users is depicted. At reference numeral 710, a user profile topic of interest interface is presented displaying topics of interest for a user and other users (e.g., friends of the user) (e.g. using a sharing component 170). At reference numeral 720, a sharing input is received indicating a selection of topics of interest to be shared and users with whom to share the topics of interest (e.g. using a sharing component 170). At reference number 730, the selected topics of interest are shared with the selected users (e.g. using a sharing component 170).

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 8:
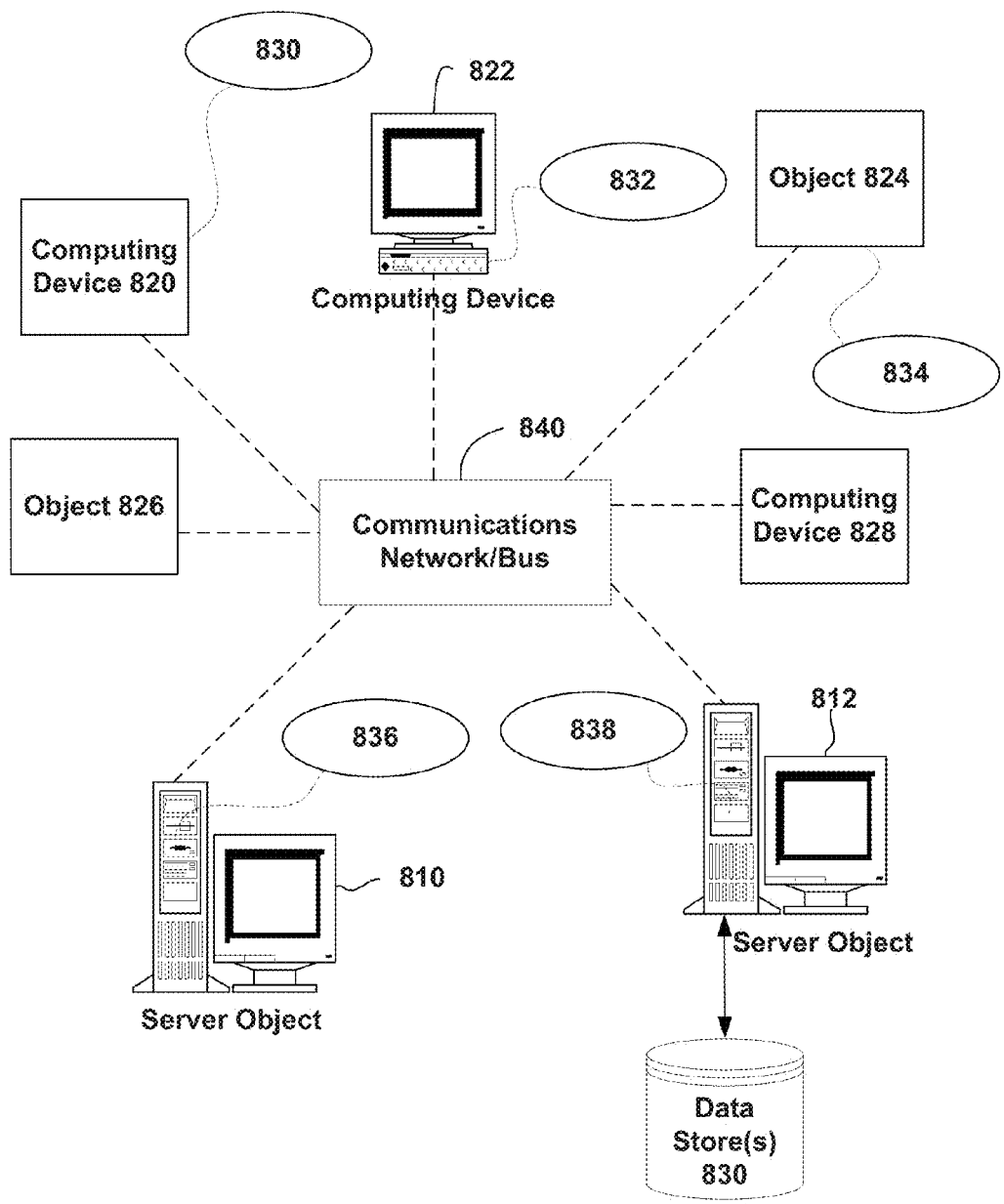
FIG. 8 is a block diagram representing an exemplary non-limiting networked environment in which the various embodiments can be implemented.

FIG. 8 provides a schematic diagram of an exemplary networked or distributed computing environment. The distributed computing environment comprises computing objects 810, 812, etc. and computing objects or devices 820, 822, 824, 826, 828, etc., which may include programs, methods, data stores, programmable logic, etc., as represented by applications 830, 832, 834, 836, 838. It can be appreciated that computing objects 810, 812, etc. and computing objects or devices 820, 822, 824, 826, 828, etc. may comprise different devices, such as personal digital assistants (PDAs), audio/video devices, mobile phones, MP3 players, personal computers, laptops, tablets, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, network 840 may comprise other computing objects and computing devices that provide services to the system of FIG. 8, and/or may represent multiple interconnected networks, which are not shown. Each computing object 810, 812, etc. or computing objects or devices 820, 822, 824, 826, 828, etc. can also contain an application, such as applications 830, 832, 834, 836, 838, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc. provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 840 is the Internet, for example, the computing objects 810, 812, etc. can be Web servers, file servers, media servers, etc. with which the client computing objects or devices 820, 822, 824, 826, 828, etc. communicate via any of a number of known protocols, such as the hypertext transfer protocol (HTTP). Objects 810, 812, etc. may also serve as client computing objects or devices 820, 822, 824, 826, 828, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 9 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. Neither is the computing environment 900 be interpreted as having any dependency or requirement relating to any one or combination of components illustrated in the exemplary operating environment 900.

With reference to FIG. 9, an exemplary computing device for implementing one or more embodiments in the form of a computer 910 is depicted. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 910. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements. Furthermore, reference throughout this disclosure to "one implementation" or "an implementation" or "one embodiment" or "an embodiment" means that a particular feature, structure, or characteristic described in connection with the implementation or embodiment is included in at least one implementation or embodiment. Thus, the appearances of the phrase "in one implementation" or "in an implementation" or "in one embodiment" or "in an embodiment" in various places throughout this specification are not necessarily all referring to the same implementation or embodiment.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
   a memory;
   a microprocessor that executes the following computer executable components stored in the memory:
      a topological component that:
         identifies a plurality of topics from respective metadata assigned to a plurality of content;
         determines relationships between the plurality of topics based upon an analysis of past user interaction with at least one of the metadata or the plurality of content; and
         generates a topic-to-topic graph indicative of the determined relationships between the plurality of topics, wherein respective topics of the plurality of topics are nodes in the topic-to-topic graph and the determined relationships between the respective topics are links between nodes in the topic-to-topic graph;
      a mapping component that:
         identifies a largest connected component in the topic-to-topic graph;
         removes from the topic-to-topic graph nodes and links not connected to the largest connect component; and
         generates a map from the topic-to-topic graph; and
      a presentation component that generates a display of the map.

2. The system of claim 1, wherein the plurality of content comprise at least one of video content, audio content, or literary content.

3. The system of claim 1, wherein the topological component assigns popularity weights to respective nodes indicative of relative popularity of respective topics associated with the respective nodes.

4. The system of claim 1, wherein the display depicts the map as a geographical map with the nodes appearing as locations on the map and the links appearing as roads on the map.

5. The system of claim 1, wherein the map is a navigable map with a panning control.

6. The system of claim 1, wherein the map is a multilayer map with a zooming control for traversing different layers of the multilayer map in response to input from the zooming control.

7. The system of claim 1, wherein the map presents at least one content associated with a node on the map.

8. The system of claim 1, wherein the map presents a marker of interest associated with a node.

9. The system of claim 1, wherein the mapping component:
   infers interest in a topic based upon past user interaction with the map or the past user interaction with the at least one of the metadata or the plurality of content; and
   assigns a marker of interest to the topic.

10. The system of claim 1, wherein the presentation component accepts an input of a marker of interest associated with a node.

11. The system of claim 1, wherein the mapping component generates the map based upon an algorithm that projects the topic-to-topic graph onto a two-dimensional space.

12. The system of claim 1, wherein the mapping component further comprises a pruning component that prunes topics from the map based upon respective popularity of the topics in view of a popularity threshold.

13. The system of claim 1, wherein the presentation component further comprises a sharing component that enables user specification in a user profile of one or more markers of interest to share with one or more other user profiles.

14. A method, comprising:
   identifying, by a device including a processor, a plurality of topics from respective metadata assigned to a plurality of content;
   determining, by the device, relationships between the plurality of topics based upon an analysis of past user interaction with at least one of the metadata or the plurality of content;
   generating, by the device, a topic-to-topic graph indicative of the determined relationships between the plurality of topics, wherein respective topics of the plurality of topics are nodes in the topic-to-topic graph and the determined relationships between the respective topics are links between nodes in the topic-to-topic graph;
   identifying, by the device, a largest connected component in the topic-to-topic graph;
   removing, by the device, from the topic-to-topic graph nodes and links not connected to the largest connect component;
   generating, by the device, a map from the topic-to-topic graph; and
   displaying, by the device, the map.

15. The method of claim 14, wherein the plurality of content comprise at least one of video content, audio content, or literary content.

16. The method of claim 14, further comprising assigning, by the device, popularity weights to respective nodes indicative of relative popularity of respective topics associated with the respective nodes.

17. The method of claim 14, wherein displaying the map comprises displaying the map as a geographical map with the nodes appearing as locations on the map and the links appearing as roads on the map.

18. The method of claim 14, wherein displaying the map further comprises displaying at least one content associated with a node on the map.

19. The method of claim 14, further comprising:
   inferring, by the device, interest in a topic based upon past user interaction with the map or the past user interaction with the at least one of the metadata or the plurality of content; and
   assigning, by the device, a marker of interest to the topic.

20. The method of claim 14, wherein generating the map comprises generating the map based upon an algorithm that projects the topic-to-topic graph onto a two-dimensional space.

21. The method of claim 14, further comprises pruning, by the device, metadata from the map based upon respective popularity of the topics in view of a popularity threshold.

22. A device, comprising:
   a memory;
   a microprocessor that executes the following computer executable components stored in the memory:
      a map-like interface component that:
         retrieves a map of a topic-to-topic graph generated from inferred relationships from a plurality of topics extracted from metadata associated with a plurality of content based upon an analysis of past user interaction with at least one of the metadata or the plurality of content, wherein the topic-to-topic graph comprises nodes representing respective topics of the plurality of topics and links between nodes representing determined relationships between the respective topics, and the topic-to-topic graph has been pruned by identification of a largest connected component in the topic-to-topic graph and removal from the topic-to-topic graph of nodes and links not connected to the largest connect component; and
         displays the map.

23. The device of claim 22, wherein the map-like interface is a geographical map interface, wherein the nodes appear as locations on the map and the links appear as roads on the map.

* * * * *